UNITED STATES PATENT OFFICE 2,498,618

POLYGLYCOL SULFATE SALTS OF DIAMINO-DIPHENYL SULFONE AND PREPARATION THEREOF

Earl W. Gluesenkamp, Centerville, Ohio, assignor to Monsanto Chemical Company, St. Louis, Mo., a corporation of Delaware No Drawing. Application November 24, 1948, Serial No. 61,895

6 Claims. (Cl. 260—397.6)

This invention relates to a new family of therapeutic agents having unusual activity in inhibiting the growth of tuberculosis bacteria. More specifically the invention relates to methods of rendering 4,4' - diaminodiphenyl - sulfone water soluble, without seriously reducing the effectiveness of the therapeutic agent.

It is known that 4,4'-diaminodiphenylsulfone is an active agent for controlling tuberculosis bacteria in culture media. Because of its insolubility in water it is not effective when used in contact with living animal tissue. It is also known that 4,4'-diaminodiphenylsulfone can be converted into water soluble derivatives by substituting hydrophilic radicals on the amino groups, and that some of these derivatives retain some of their therapeutic activity. One such derivative, which is known as "Promin" and is commercially available for the purpose of inhibiting the growth of tuberculosis bacteria, has the structure:

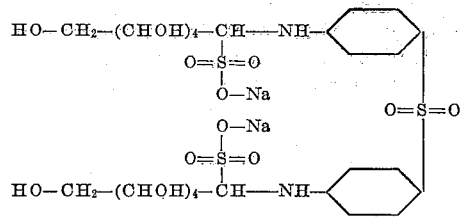

Although this prior art compound is widely used, because of its solubility, it is much less active than the diaminodiphenylsulfone.

The primary purpose of this invention is to provide new water soluble derivatives of 4,4'-diaminodiphenylsulfone which have better bacteristatic activity than commercially available derivatives. A further purpose of the invention is to provide a method of converting 4,4'-diaminodiphenylsulfone into water soluble derivatives without seriously impairing the therapeutic activity. A still further purpose is to provide new medicinal compounds.

It has been found that 4,4'-diaminodiphenylsulfone can be made water soluble by reacting one or both its amino groups with sulfuric acid which has been partially esterified by a long chain polyethylene glycol. The compounds of this class will have the following structural formula:

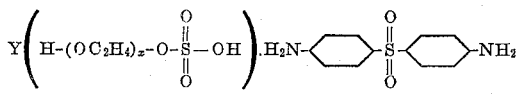

wherein $x$ is a whole number from five (5) to thirty (30), inclusive, and $Y$ is a small whole number from one (1) to two (2), inclusive.

The new compounds may be prepared from the polyethylene glycol by a partial sulfation procedure, which is preferably effected by dissolving the polyethylene glycol in liquid sulfur dioxide and adding thereto an equimolar proportion of sulfur trioxide. The partial esters of sulfuric acid so prepared are then reacted with the 4,4'-diaminodiphenylsulfone in one-half molar, either two moles of the partial ester for each mole of sulfone for the preparation of the difunctional salt, or one equimolar proportion for the preparation of the monofunctional salt.

The salts are prepared by mixing the solid sulfone with the liquid partial ester, the reaction proceeding with the liberation of heat. The reaction mass is then dissolved in the minimum quantity of hot water and recovered by cooling or evaporation to dryness.

The new compounds are water soluble and therefore more effective in the treatment of bacteria in the presence of animal tissue than the 4,4' - diaminodiphenylsulfone. The compounds are also substantially more effective than the "Promin" used by the prior art and described more fully above.

Further details of this invention are set forth with respect to the following specific examples.

Example 1

A flask was charged with liquid sulfur dioxide and 139.6 parts by weight of a polyethylene glycol having a molecular weight of approximately 600. The completely miscible mixture thereby produced was then treated by adding 18.6 parts by weight of freshly prepared sulfur trioxide over a period of fifteen minutes. The mixture was then warmed on a water bath under reduced pressure to remove the sulfur dioxide. The partial ester of polyethylene glycol and sulfuric acid was thereby produced.

The salt of 4,4'-diaminodiphenylsulfone was made by reacting 15.5 grams of the ester described in the preceding paragraph and 6.2 grams of the sulfone, the latter being added gradually to the liquid ester. The resulting reaction mass was then dissolved in 25 cc. of water and the solution treated with activated charcoal to remove color. After a pH determination showed that the reaction mass was excessively acidic, another 0.5 gram lot of the sulfone was added. The resulting product was found to be very soluble in hot water and difficultly soluble in cold water. The compound had the following probable structure:

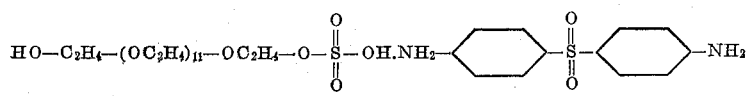

Example 2

The procedure described in the preceding example was repeated except that 8.3 grams of 4,4'-diaminodiphenylsulfone was used, only part of the reaction mass was water soluble and 5.3 grams of unreacted sulfone was recovered. The water soluble portion was recovered by evaporation and the solid product so produced was identified as consisting substantially of the following compound.

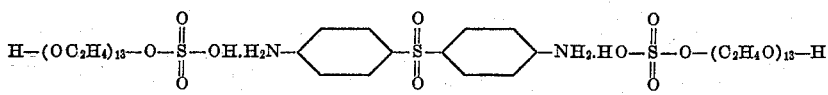

Example 3

The bacteristatic effect of the compounds prepared in the preceding examples were treated, as well as the prior art compound "Promin." Using bacteria cultures of *Mycobacterium tuberculosis* H37Rv, the minimum concentrations of each compound which would inhibit bacteria growth, was measured. The following table sets forth the minimum concentration in milligram percent.

Salt of Example 1 _____ 25.
Salt of Example 2 _____ 1.0
"Promin" _____ 65.

The invention is defined by the following claims.

I claim:

1. A compound having the following structural formula:

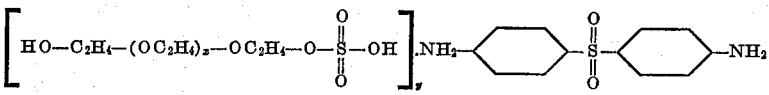

wherein $x$ is a whole number from five (5) to thirty (30), inclusive, and $y$ is a small whole number from one (1) to two (2), inclusive.

2. A compound having the following structural formula:

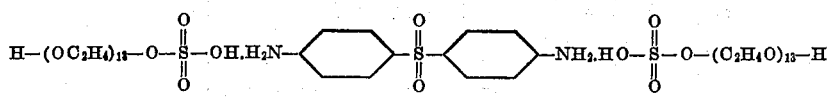

3. A compound having the following structural formula:

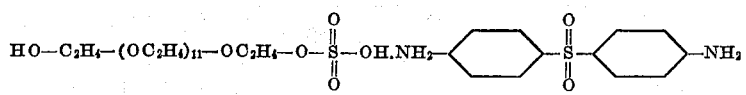

4. A method of preparing a derivative of 4,4'-diaminodiphenylsulfone which comprises reacting one mole of 4,4'-diaminodiphenylsulfone with from one to two moles of the compound having the structural formula:

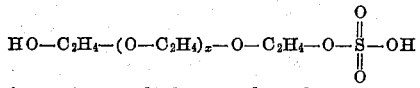

wherein $x$ is a whole number from five (5) to thirty (30).

5. A method of preparing a derivative of 4,4'-diaminodiphenylsulfone which comprises reacting one mole of 4,4'-diaminodiphenylsulfone with two moles of a compound of the structure:

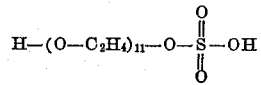

6. A method of preparing a derivative of 4,4'-diaminodiphenylsulfone which comprises reacting one mole of 4,4'-diaminodiphenylsulfone with one mole of a compound of the structure:

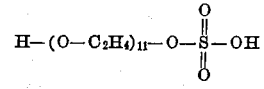

EARL W. GLUESENKAMP.

No references cited.